April 14, 1953 T. C. O'GORMAN 2,634,424
ARTIFICIAL LEG
Filed Sept. 12, 1951 2 SHEETS—SHEET 1
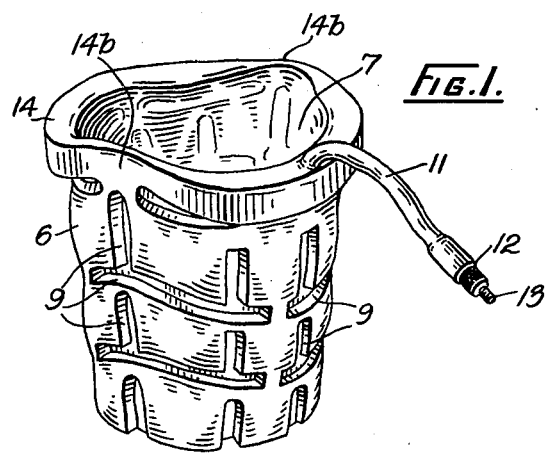
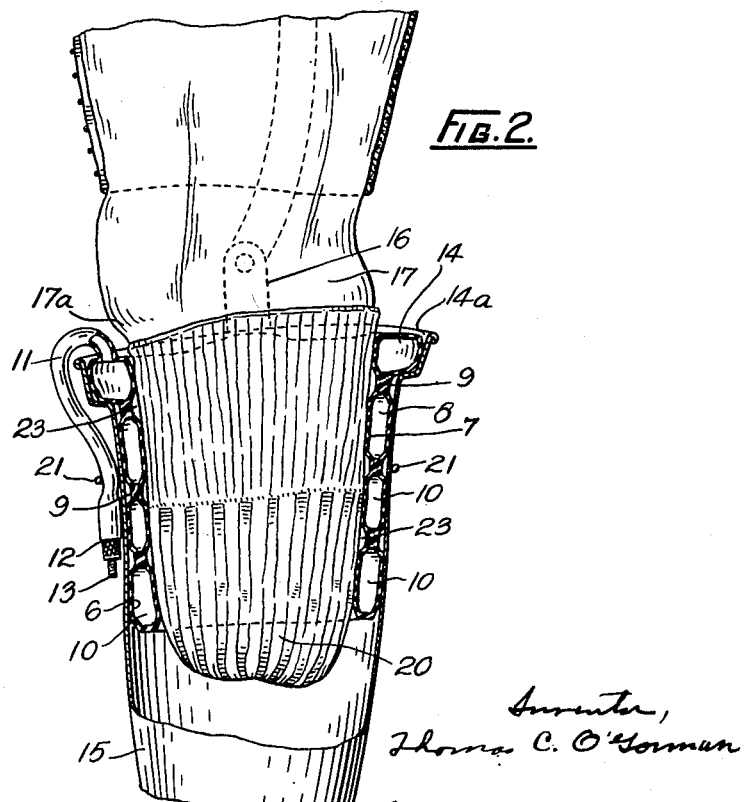

April 14, 1953     T. C. O'GORMAN     2,634,424
ARTIFICIAL LEG
Filed Sept. 12, 1951     2 SHEETS—SHEET 2
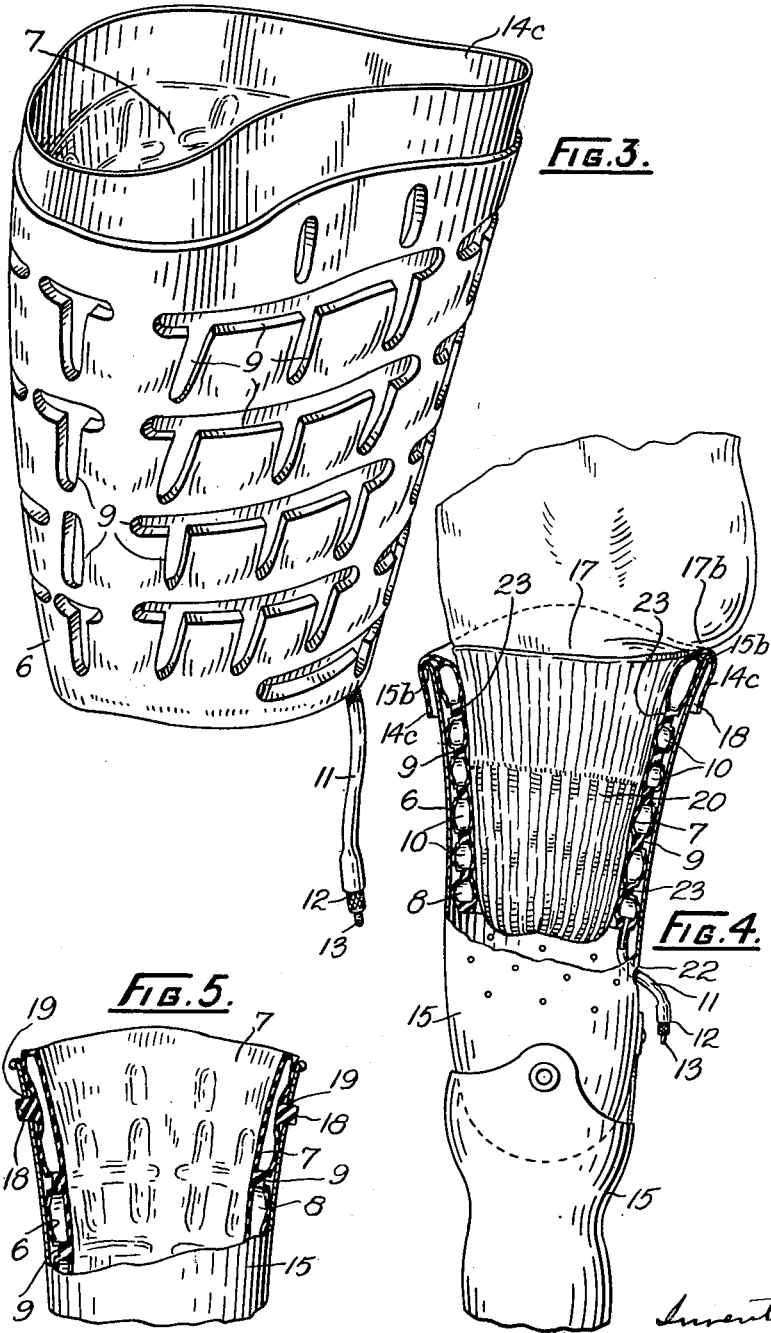
Inventor,
Thomas C. O'Gorman
By [signature]
Attorney Patented Apr. 14, 1953

2,634,424

UNITED STATES PATENT OFFICE 2,634,424

ARTIFICIAL LEG

Thomas C. O'Gorman, Greenside, Johannesburg, Union of South Africa

Application September 12, 1951, Serial No. 246,177
In the Union of South Africa September 19, 1950

3 Claims. (Cl. 3—20)

This invention relates to artificial legs.

An artificial leg is manufactured with a socket into which the stump is inserted. For the comfort of the wearer, it is essential that the socket conform exactly to the contour of the stump. The customary procedure is to approximate the socket to the contour of the other limb, and to fabricate a leather socket to be an exact complement of the stump. The socket is then inserted into and secured to the artificial limb.

Obviously, the fabrication of a leather socket calls for a high order of skill, since any inaccuracies will inevitably result in discomfort, abrasions and consequent skin ailments. It follows, too, that the cost of the artificial limb is necessarily high.

The object of the present invention is to provide a socket which is more satisfactory than the leather socket, from the points of view of comfort, health, cost and speediness of manufacture.

According to the invention, the socket is double walled, and is made of a resiliently flexible material; the walls being spaced apart to provide an enclosed air-tight cavity with a series of webs spanning it and dividing it into a number of interconnected compartments; and there is a valve to permit inflation or deflation of the socket.

Further according to the invention, the socket includes a series of webs spanning the cavity and dividing it into a number of interconnected compartments. The webs are preferably arranged longitudinally as well as circumferentially to provide a reticulation of compartments.

Two embodiments of the invention are illustrated in the accompanying drawings in which Figure 1 is a perspective view of a socket suitable for a "below-knee" amputation;

Figure 2 is a vertical section of the socket of Figure 1 in use;

Figure 3 is a perspective view of a socket suitable for an "above-knee" amputation;

Figure 4 is a vertical section of the socket of Figure 3 in use; and

Figure 5 is a side view partly in section of the socket of Figures 3 and 4, slightly modified.

The sockets illustrated are made of soft rubber, natural and synthetic. They are constructed to provide two walls 6, 7 spaced apart to provide a cavity 8.

The walls 6, 7 are connected together by a series of webs 9 which extend both longitudinally and circumferentially, and which are sufficiently discontinuous to divide the cavity 8 into a reticulation of compartments 10 which intercommunicate.

A flexible pipe 11 is attached to the socket; in Figures 1 and 2 at the top, and in Figures 3 to 5 at the bottom. The pipe communicates with the reticulation of compartments 10, and at its outer end it has a non-return valve 12 with a nipple 13 suitable for the pipe to be connected to inflating means such as a bicycle pump.

At its upper end, the socket has a fillet or fillets 14 the purpose of which is to locate the socket in a container provided by the upper end of an artificial limb 15.

In Figures 1 and 2, the fillet 14 is a bead extending around the greater part of the circumference of the socket and accommodated within an annular recess 14a at the top of the limb 15. The fillet is discontinued at 14b to provide gaps for the supporting iron 16, and is inclined to the axis of the socket to clear the patella and hamstrings of the stump 17.

In Figures 3 and 4, the fillet consists in a flap 14c which is folded back over the socket, as shown in Figure 4, to form a recess 18 to receive the upper end 15b of the limb 15.

The fillet 14 acts also to locate the socket on the stump 17 and prevent it from creeping upwardly, since the fillet is rather stiffer than the remainder of the socket and abuts against the knee structure 17a (Figure 2), or the groin and the fleshy protuberance of the buttock 17b (Figure 4).

In Figure 5, the socket is located within the limb 15 by means of several bosses 18 which engage in a recess or recesses, such as registering holes 19, formed in the wall of the limb 15.

In use, the stump 17 clad in the usual stocking 20 is inserted into the cavity of the artificial limb 15, with the deflated socket between them. The socket is then inflated. The pipe 11, in Figures 1 and 2, is bent over the limb 17 and held against it by a rubber band 21. In Figures 3 to 5, the pipe passes through a hole 22 in the limb to expose the nipple 13.

Inflation of the socket causes it frictionally to engage both the stump 17 and the limb 15. The stump 17 is thus pneumatically cushioned within the limb.

Since the socket moulds itself to the exact contour of the stump 17 on inflation, it need not be custom-built; and a few standard sizes of sockets can therefore be fabricated to suit all cases. The cost of such standard sockets being obviously far less than that of a custom-made leather socket, the cost of the limb as a whole is materially reduced.

The frictional engagement of the socket around the stump 17 also is beneficial to the comfort of the wearer, since relative movement between the stump 17 and the limb 15 is largely if not wholly taken up by movement of the walls 6, 7 relatively to one another; so that the stump 17 is not subjected to abrasion. On the other hand, the presence of the webs 9 prevents such relative movement of the walls 6, 7 as would cause the stump 17 to move wholly or partially out of the limb 15.

The socket of the invention is beneficial to health also by reason of the fact that inflation of the socket does not occur at and in the vicinity of the webs, so that a series of air pockets or ducts 23 result.

I claim:

1. A socket for the stump of an amputated leg, the socket being double-walled and made of a resiliently flexible material, the walls being spaced apart to provide an enclosed airtight cavity; a series of webs spanning the cavity and dividing it into a number of interconnected compartments; and a valve secured to the socket to permit inflation and deflation of the socket.

2. The socket claimed in claim 1 in which the webs are arranged longitudinally as well as circumferentially to provide a recticulation of compartments.

3. The socket claimed in claim 1 in which the webs are arranged to provide, on inflation of the socket, a series of air pockets at least at the inside surface of the socket.

THOMAS C. O'GORMAN.

References Cited in the file of this patent

UNITED STATES PATENTS

| Number | Name | Date |
|---|---|---|
| 708,685 | White | Sept. 9, 1902 |
| 876,017 | Roberts | Jan. 7, 1908 |
| 1,868,303 | Balch et al. | July 19, 1932 |

FOREIGN PATENTS

| Number | Country | Date |
|---|---|---|
| 61,018 | Austria | Feb. 10, 1913 |